Feb. 18, 1969
G. KLEIN
3,428,836
ELECTRIC CURRENT GENERATORS OF THE MAGNETOHYDRODYNAMIC TYPE
Filed July 20, 1965
FIG. 1
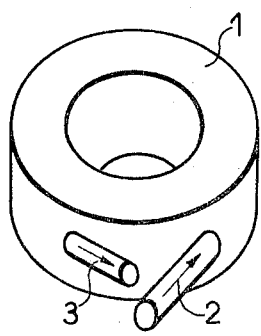
FIG. 2
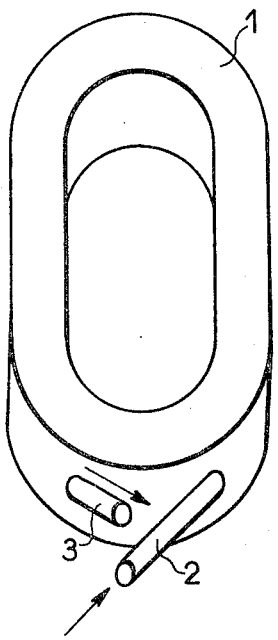
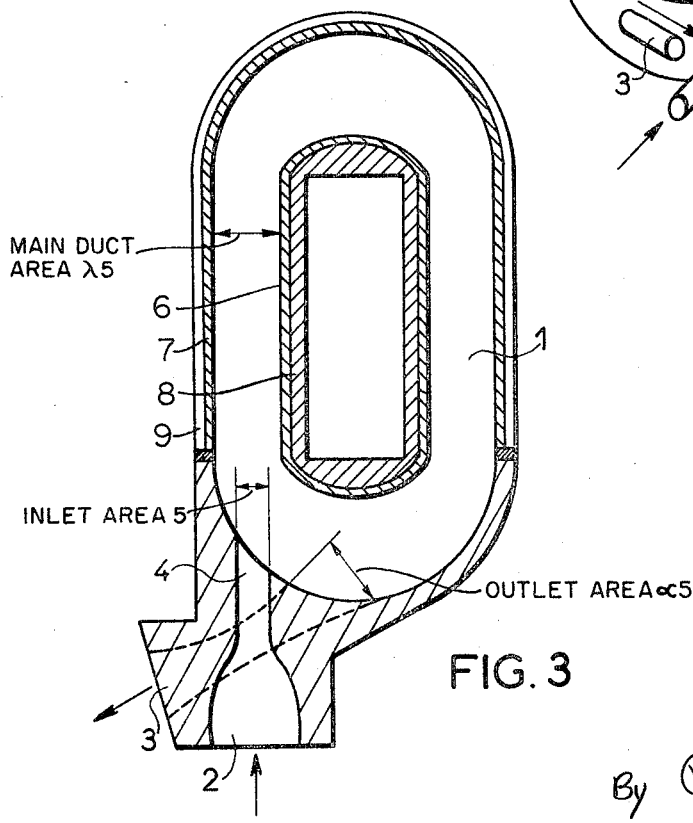
FIG. 3
INVENTOR
Georges Klein
By Paul M. Craig, Jr.
ATTORNEY

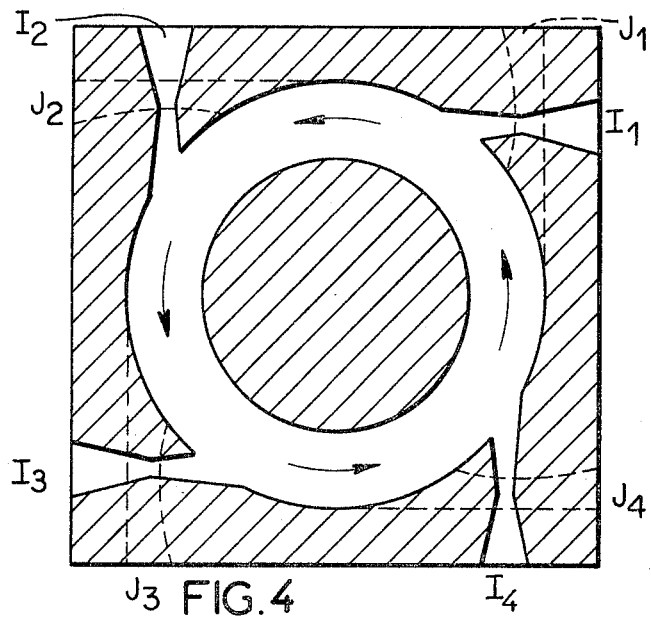
FIG. 4
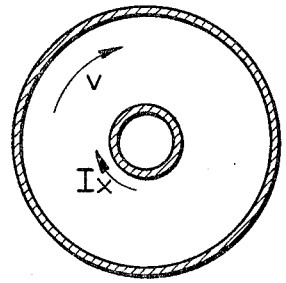
FIG. 5a
FIG. 5b
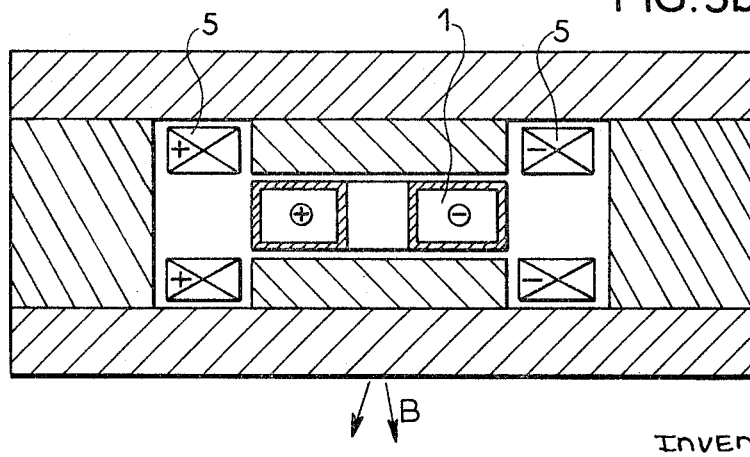

United States Patent Office 3,428,836
Patented Feb. 18, 1969

3,428,836
ELECTRIC CURRENT GENERATORS OF THE MAGNETOHYDRODYNAMIC TYPE
Georges Klein, Paris, France, assignor to Compagnie Generale d'Electricite, Paris, France, a corporation of France
Filed July 20, 1965, Ser. No. 473,398
Claims priority, application France, July 28, 1964, 983,283; Mar. 16, 1965, 9,402
U.S. Cl. 310—11                      5 Claims
Int. Cl. H02k 45/00

ABSTRACT OF THE DISCLOSURE

A magnetohydrodynamic generator having an annular duct positioned in a magnetic field, an inlet in the form of a convergent-divergent nozzle connected to the outer wall of said duct in substantially the same plane as an outlet pipe transverse to the central axis of the annular duct.

---

The present invention relates to electric current generators of the magnetohydrodynamic type.

It is known that such generators are essentially constituted of a duct disposed in the magnetic field of an electromagnet and provided with electrodes, in which flows a warm gas through an inlet pipe and an outlet pipe.

The magnetohydrodynamic generator according to the present invention is essentially characterized in that the duct has a closed loop shape forming a single turn, and comprises on the one part, an inlet pipe provided with a convergent-divergent nozzle in which is injected a warm gas at a subsonic speed which accordingly penetrates into the duct at a supersonic speed with a "mass flow" lower than the mass flow of the gas flowing inside the duct and, on another part, an outlet pipe, said pipes emerging in the duct approximately perpendicularly to the duct cross-section at said points.

Thanks to this arrangement, an appreciable part of the gas injected into the duct through the inlet pipe, instead of being drained through the outlet pipe after having passed once along the duct length between the two pipes, flows several times along this length before being evacuated.

This results in that, for a given mass $m'$ of injected gas into a mass $m''$, the $m'+m''$ mass flow rate inside the duct (mass flow) is several times higher than the flow rate of the injected gas. The ratio G between the two flow rates of the gas will be termed $$G = m' + m''/m' + 1 + \lambda/\alpha$$

where $\lambda$ is the ratio between the main section area of the duct and inlet pipe area, and $\alpha$ is the ratio between the outlet pipe area and the inlet pipe area.

Of course, that ratio G depends on many factors peculiar to the duct construction and supply, but it may reach a value ranging from 5 to 10. On the contrary, in thet conventional generator the ratio G is always equal to one.

It is obvious that, in such a generator designed according to the invention, the duct cross-section must be $\lambda$ times larger than the conventional generator of the same power, but its length must be $\lambda$ times smaller than those of a conventional duct of the same electrical power. Thereby the surface of the duct walls is $\sqrt{\lambda}$ times smaller than a conventional duct, other things being equal, this resulting in a decrease of thermal losses by the walls.

As has been said hereabove, the warm gas injection speed must be supersonic, while the flowing speed of said gas inside the loop must be subsonic in order to ensure a high conversion factor.

As a matter of fact the generator converts into electrical energy essentially the difference between the respective values of the gas kinetic energy at the input and output of the duct.

Besides, injection at supersonic speed provides some freedom of choice for the injection pressure, which must be equal to the pressure inside the loop if the injection was subsonic.

The injectors shape is chosen, as it has been said, in order to obtain this condition.

According to another feature of the present invention the duct and the gas inlet and outlet pipes are arranged so that the gas may enter and flow out said duct with a zero radial speed, the openings of said inlet and outlet pipes being, to this effect, symmetrically disposed with respect to the axis of the duct and at distinct cross-sections of this latter.

The accompanying drawings represent, by way of examples, two possible embodiments of magnetohydrodynamic generator duct according to the invention.

FIGURE 1 is a perspective view of a duct having the shape of a circular loop, FIGURES 2 and 3 are respectively perspective and sectional views of an oblong loop duct, FIGURE 4 is a cross sectional view of a duct provided with four injectors and FIGURES 5a and 5b are sectional views of a generator provided with an electromagnet energized by the Hall current.

In FIGURES 1 and 2, 1 is the duct itself, 2 is the gas inlet pipe and 3 is the gas outlet pipe; in FIGURE 3, the nozzle 4 of the inlet pipe 2 is also shown; in FIGURE 4, $I_1$, $I_2$, $I_3$, $I_4$, designate the four inlet and $J_1$, $J_2$, $J_3$, and $J_4$ designate the four outlet.

In FIGURES 5a (sectional view) and 5b (longitudinal view) are shown auxiliary windings 5 used for the starting of the generator; B is the magnetic induction due to the Hall current, V is the direction of the gas rotation and $Ix$ the current flowing direction.

If, by way of example, a circular duct as shown in FIGURE 1, is of a one-meter radius and a rectangular section 0.5 meter broad and 2 meters high, calculation shows that it is possible to circulate in such a duct a thermal power of 400 megawatts by supplying at the inlet a thermal power of 40 megawatts which gives a G coefficient of 10. As a comparison a conventional type equivalent duct should be 63 meters long and the thermal losses would amount to 40 megawatts, i.e. all the thermal energy applied at the inlet would be dissipated as losses Such a duct is then not practical.

It is to be noted that, in a generator according to the invention, a Hall current appears along the walls, but there is no Hall voltage because said voltage is short-circuited; this is due to the fact that the ionized gas is, in a way, "looped on itself." Consequently it is not necessary to divide the electrodes 6 and 7 along the duct walls 8 and 9, and that enables use of a continuous electrode. In contrast to conditions in a conventional generator with a continuous electrode, the Hall currents do not circulate in the continuous electrode.

If necessary, it is possible to render the gas conductivity, instead of natural and constant along the whole length of the duct, artificially increased and non homogeneous. This can be performed, for instance, with auxiliary electrodes and by creating an electrical discharge between those of the auxiliary electrodes, which are opposite each other on either face of the duct. Besides, the longitudinal current generated by the Hall effect in the gas may cause a temperature rise of the electrons, if the circulating gas is a monatomic one.

Finally, if that Hall current is intense, it may be used to energize the electromagnet mentioned in the foregoing, which then does no longer necessitate a separate energizing source. The electromagnet could however, be provided with a supplementary winding, fed by an auxiliary source supplying a control current of small power, direct or alternative according as the generator must itself supply A.C. or D.C. current: the generator would then operate as, in a way, a control current amplifier.

It is also to be noted that, in the case where the gas contains an ionizable seed (an additive) such as an alkaline salt intended to increase the conductivity of the gas, this additive may be injected into the duct through a pipe distinct from the gas inlet; the gas supply pipe must not then be made resisitive to the corrosive action of the additive. More particularly, the duct electrodes can be built so that the additive may be injected through said electrodes, this creating in the immediate vicinity of these electrodes a high conductive zone.

As has been said in the foregoing, the generator structure according to the invention is such that the thermal power of the gas circulating inside the duct is G times (G having been defined hereabove) higher than the thermal power supplied by a burner which heats the gases at the duct entrance. This arrangement makes it possible to proceed to test runs on a generator having a certain thermal power, while making use of a burner having a lower thermal power, which reduces considerably the price of such burner equipment.

It is finally specified that the generator according to the invention may be used with any gas type, either a gas obtained by combustion or a monatomic inseminated gas.

According to another embodiment of the generator according to the invention, the warm gas injection in the loop can be achieved by several injectors. The advantage afforded by this arrangement is to reduce, in the ratio of the number of injectors, the magnetohydrodynamic pressure drop due to the electric energy extraction, as well as the dimensions of each injector with respect to the ones of the loop section side.

The injection of the seed into the gas of the duct can be performed through consumable electrodes as the applicant has indicated it in the French Patent No. 1,380,721, of Oct. 24, 1963. Such electrodes can be made using a binder, for example graphite or doped graphite (barium, zircon, $CO_3K_2$) or potassium carbonate powder.

If the pressure in the loop is relatively low, which limits the thermal exchanges, this loop may be made of massive refractory materials. If the combustion gases temperature inside the loop is ranging about 2200° K., insulating walls of zircon or of calcium zirconate may be used for instance, the proportion of the components of this mixture being such that the electric resistance of this latter be high.

The gas conductivity inside the loop can be increased through inseminating this gas with colloids, for instance barium oxide preferably as particles having a diameter ranging from some hundreth to some tenth of one micron. This proves to be particularly advantageous when the gases circulating inside the loop have a relatively low temperature. This results indeed in a certain heterogeneity of the plasma, but this drawback is less perceptible in a loop generator according to the invention than in a conventional generator, because of the strong turbulence of the gases in the duct due to the injection of these with supersonic speed.

The colloidal particles may be injected by means of the electrodes.

The thermal leakage which occur through the walls of the loop shaped duct can be used to heat the gas supporting the oxidation into the generator combustion chamber or chambers, which makes it possible to reduce the quantity of oxygen which must be contained in the supporting oxidation gas.

Finally the insulating walls of the generator loop can be protected against the injection inseminated gas action through a blow-by of noninseminated warm gases.

What I claim is:
1. A magnetohydrodynamic generator comprising
   magnetic field generating means for generating a magnetic field,
   an annular duct positioned within said magnetic field with the central axis thereof parallel to the magnetic field and having first and second electrodes disposed along the inner walls thereof,
   gas inlet means including an inlet pipe connected substantially tangentially to the outer wall of the duct for introducing gas into said duct, and
   gas outlet means including an outlet pipe connected substantially tangentially to the outer wall of the duct in substantially the same plane as said gas inlet means for withdrawing gas from said duct,
   the substantially same plane of said gas inlet means and gas outlet means being transverse to the central axis of said annular duct.

2. A magnetohydrodynamic generator as defined in claim 1 wherein said gas inlet means further includes a convergent-divergent nozzle connected to said inlet pipe for injecting gases into said duct at supersonic speed.

3. A magnetohydrodynamic generator as defined in claim 1 wherein said inlet pipe has a smaller cross-sectional area than said duct so that the speed of the gas flow in the duct is subsonic.

4. A magnetohydrodynamic generator as defined in claim 1 and further including auxiliary inlet means communicating with said duct through one of said first and second electrodes for injecting a seed into the duct.

5. A magnetohydrodynamic generator as defined in claim 1 wherein said inlet pipe and said outlet pipe extend substantially transverse to each other.

References Cited

UNITED STATES PATENTS

| 3,217,190 | 11/1965 | McLafferty | 310—11 |
| 3,345,523 | 10/1967 | Grunwald | 310—11 |
| 3,355,608 | 11/1967 | Gebel | 310—11 |

J D MILLER, *Primary Examiner.*

D. X. SLINEY, *Assistant Examiner.*